(12) United States Patent
Li et al.

(10) Patent No.: US 8,064,729 B2
(45) Date of Patent: Nov. 22, 2011

(54) IMAGE SKEW DETECTION APPARATUS AND METHODS

(75) Inventors: Jia Li, North York (CA); Hui Zhou, Toronto (CA)

(73) Assignee: Seiko Epson Corporation, Tokyo (JP)

(*) Notice: Subject to any disclaimer, the term of this patent is extended or adjusted under 35 U.S.C. 154(b) by 902 days.

(21) Appl. No.: 12/062,430

(22) Filed: Apr. 3, 2008

(65) Prior Publication Data

US 2009/0252437 A1    Oct. 8, 2009

(51) Int. Cl.
 *G06K 9/36*  (2006.01)
(52) U.S. Cl. ........................................... 382/289
(58) Field of Classification Search .................. 382/289, 382/290, 293–296
See application file for complete search history.

(56) References Cited

U.S. PATENT DOCUMENTS

| | | | |
|---|---|---|---|
| 5,491,759 A | 2/1996 | Nagao et al. | |
| 5,517,587 A | 5/1996 | Baker et al. | |
| 5,528,387 A | 6/1996 | Kelly et al. | |
| 5,568,571 A | 10/1996 | Willis et al. | |
| 5,594,817 A | 1/1997 | Fast et al. | |
| 5,818,976 A | 10/1998 | Pasco et al. | |
| 5,870,508 A | 2/1999 | Park | |
| 5,901,253 A | 5/1999 | Tretter | |
| 6,310,984 B2 | 10/2001 | Sansom-Wai et al. | |
| 6,360,026 B1 | 3/2002 | Kulkarni et al. | |
| 6,373,590 B1 * | 4/2002 | Ancin et al. | 358/1.18 |
| 6,415,064 B1 | 7/2002 | Oh | |
| 6,470,096 B2 * | 10/2002 | Davies et al. | 382/203 |
| 6,999,209 B2 | 2/2006 | Kelly et al. | |
| 7,145,699 B2 | 12/2006 | Dolan | |
| 7,200,285 B2 | 4/2007 | Li et al. | |

FOREIGN PATENT DOCUMENTS

| | | |
|---|---|---|
| JP | 06052354 | 2/1994 |
| JP | 2004129271 | 4/2004 |
| WO | 2006022729 | 3/2006 |

OTHER PUBLICATIONS

Real-Time Edge Detection/Rotation of Check Images, N. A. Phan and C. F. Rohe, IBM Technical Disclosure Bulletin, vol. 35, No. 4A, Sep. 1992, (pp. 424-428).
Measuring Document Image Skew and Orientation, Dan S. Bloomberg, Gary E. Kopec and Lakshmi Dasari, Xerox Palo Alto Research Center, Feb. 1995, (pp. 1-19).
Vision Systems, David Marshall, Jul. 4, 1997.

* cited by examiner

*Primary Examiner* — Yon Couso
(74) *Attorney, Agent, or Firm* — Mark P. Watson

(57) ABSTRACT

Methods and apparatus for detecting skew in a document image, such as a check image, to produce a de-skewed image are described. One example method includes detecting one or more lines in the image and determining whether the one or more lines are reliable. Reliability of a line may be based on at least one of line length, straightness, and the presence of holes in the line. If one or more lines are reliable, the method may calculate a skew angle of the image based on the one or more reliable lines' orientations with respect to an orientation of the image. A comparison may also be made between lines detected in different regions of the check to determine if a difference between skew angles corresponding to each of the compared lines is lower than an error threshold.

8 Claims, 6 Drawing Sheets

IMAGE SKEW DETECTION APPARATUS AND METHODS

THE FIELD OF THE INVENTION

The present invention relates to detection of skew in images. More specifically, embodiments of the present invention relate to methods and apparatus for detecting and correcting skew in images, such as scanned check images and the like.

BACKGROUND

As used herein, the term skew refers to a rotational misalignment of an image, such as an image of a document, with respect to a coordinate system, such as the coordinate system of a scanner used to capture an image of the document. Character recognition or other classification algorithms often depend on a minimally acceptable alignment of the scanned document being analyzed. Skew not only affects processes such as character recognition, but also degrades the quality of document display.

A variety of techniques are typically employed to ensure proper alignment with respect to a scanner's (or similar imaging device) imaging coordinate system. Such techniques may include the use of automatic document feeders, guides, arms, etc., to physically align a scanned document as it is fed into the scanner. However, these techniques can be costly, can reduce document throughput, and may frequently be unreliable. For example, the document may not be fed properly into the scanner due to tears, wrinkles, or a feed mechanism malfunction. In addition, many scanners permit manual positioning of bulky items such as books. The resulting scanned images will frequently be skewed, thereby prohibiting or at least inhibiting successful classification processes such as character recognition.

Automatic methods of skew detection may also be employed. However, textures, lines, images, characters, or some mixture thereof on a document's face and/or the occasional presence of tears and wrinkles pose significant challenges for quick and accurate skew detection.

It would be desirable if a scanned document could be de-skewed with a simple and effective process that does not depend on mechanical means.

SUMMARY OF EXAMPLE EMBODIMENTS

In general, embodiments of the present invention are directed to methods and apparatus for automatically detecting the skew of an image, such as a scanned document. A first example embodiment is directed to a method for detecting image skew based on lines detected in the image to produce a de-skewed image. The method may include detecting one or more lines in the image and determining whether the one or more lines are reliable. Reliability of a line may be based on at least one of line length, straightness, and the presence of holes in the line. If one or more lines are reliable, the method may calculate a skew angle of the image based on the one or more reliable lines' orientations with respect to an orientation of the image. The detection of lines may be implemented by applying edge detection filters and dividing the image into search regions, among other techniques. A comparison may be made between lines detected in different search regions to determine if a difference between skew angles corresponding to each of the compared lines is lower than an error threshold.

In a second example embodiment, one or more computer-readable media have computer-readable instructions thereon which, when executed, implement the method for detecting image skew based on lines detected in the image to produce a de-skewed image discussed above in connection with the first example embodiment.

In yet another embodiment, an image processing device such as an image scanner, is provided that provides an automatic de-skewing capability of the sort described in connection with the first example embodiment.

By providing an automated de-skewing capability, embodiments of the present invention avoid many of the problems of the prior art that rely on mechanical techniques for aligning a document. Moreover, the techniques utilized minimize inaccuracies that might otherwise be introduced by, for example, imperfections in the document.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The principles and methods described herein can be used to detect skew in images of documents including, for example, checks, bank notes, identification cards, reports, articles, etc. Moreover, the image may be obtained via an imaging device such as a scanner, a camera, or a computer readable medium or transmission medium associated with or connected to the imaging device. For purposes of illustration, the skew detection methods are described with reference to scanned check images.

In the following description, methods and systems for detecting skew in a document may use the document's borders or straight long lines on the document's face. For example, a black non-document region may appear around the outer edge of a scanned document, which may be detected as a border. When no such border exists or is too small due to cropping, the skew detection methods may detect the borders or lines on the face of the scanned document.

Figure 1A:
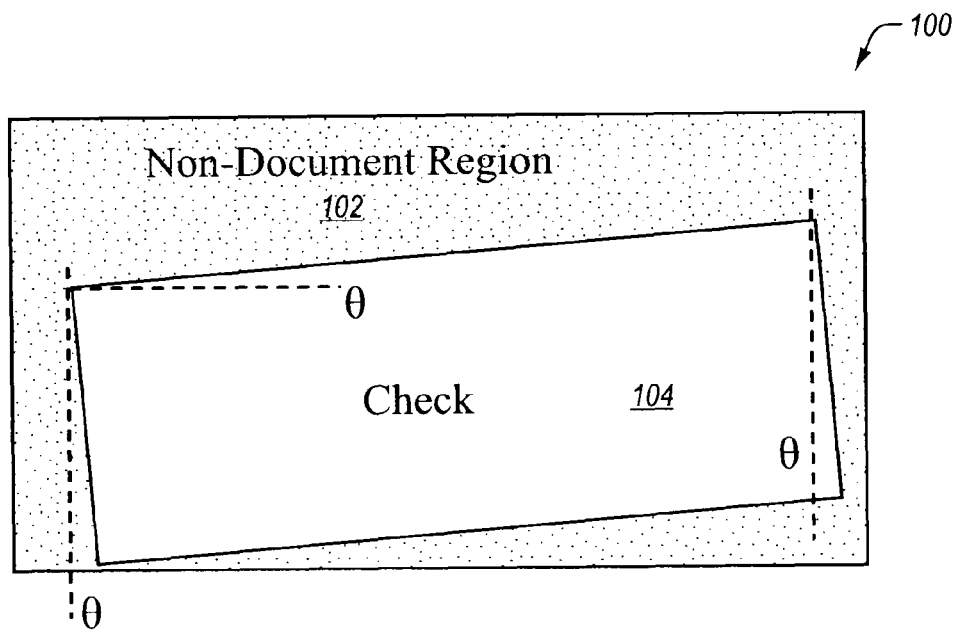
FIGS. 1A and 1B illustrate a exemplary plan views of a representation of a digital image including a check.
Figure 1B:
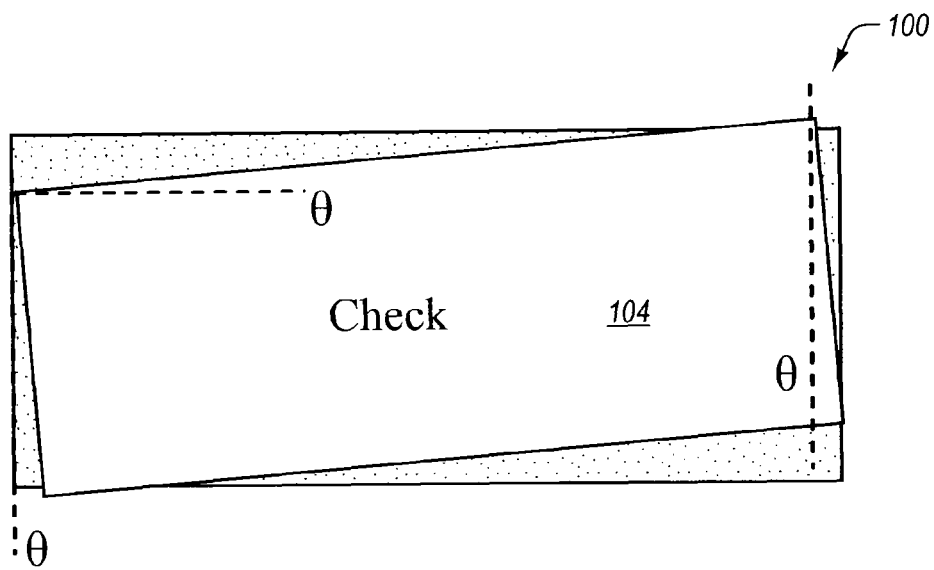

FIGS. 1A and 1B are plan views of a representation of a digital image 100. In FIG. 1A, image 100 includes a non-document region 102 and a scanned check 104 that is skewed with respect to an imaging coordinate system associated with image 100. A skew angle θ of scanned check 104 can be detected based on the orientation of any one of the check's borders. The dashed lines shown near each of the top, left, and right borders of the check are parallel to the axes of the imaging coordinate system. Therefore, the orientation of each border with respect to a corresponding axis may be used to determine the skew angle of check 104.

Many scanners will produce a dark region around a scanned document as part of the scanning process. The dark region, represented by non-document region 102, will typically be a monochrome dark shade relative to the pixel intensities on the face of check 104. Image processing techniques, such as edge detection, may be applied to detect pixel intensity differentials along the borders of check 104 and thereby determine a skew angle θ, as described above. However, the reliability, accuracy, and speed of such techniques will vary according to various parameters of the edge detection algorithm, image quality, and features on the face of check 104, as well as other variables.

Moreover, as shown in FIG. 1B, non-document region 102 may be substantially cropped out of image 100, making detection of the borders surrounding check 104 more difficult. Although lines parallel to the borders may appear on the face of check 104, the lines may be obscured by other noise-like features (e.g., text, graphics, tears, wrinkles, etc.) on the face of check 104, making the lines difficult to detect. Moreover, some lines on the face of check 104 may not be aligned with or parallel to the check's borders. Therefore, methods consistent with the present invention may be adapted to detect lines despite the presence of noise or noise-like features and may be adapted to ensure a line is reliable before using it to calculate a skew angle.

1. Overview of Skew Detection Methods

Figure 2:
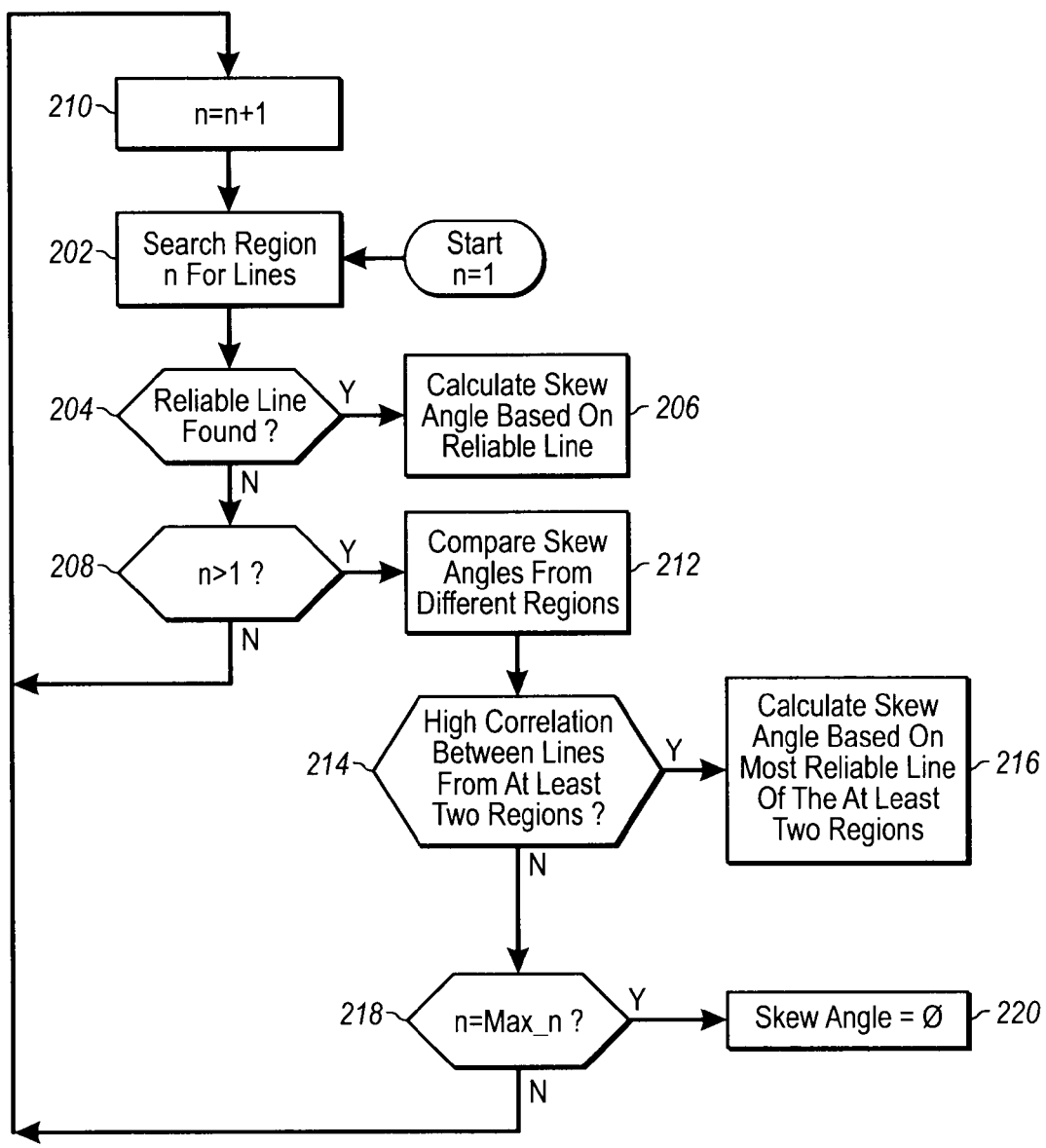
FIG. 2 illustrates an exemplary embodiment of a method for implementing skew detection consistent with the present invention.

FIG. 2 shows an exemplary method that may be implemented to determine a document's skew angle. A document, such as check 104 of FIGS. 1A and 1B, may be divided into "n" search regions. The method may first search for a border or line in the first region (stage 202) by, for example, initializing the region index "n" to 1. In certain embodiments where the scanned document is expected to be rectangular, such as a check, the number of search regions may be four, each region corresponding to a border of the rectangular document. However, search time may be saved by searching only two or three regions since each border is expected to have a deterministic orientation with respect to all other borders (e.g., parallel or perpendicular). Moreover, if documents are scanned with one of the borders cropped out or directly on an edge of the scanning area, the cropped out or edge-aligned border may be more time consuming to detect than the other borders. Thus, the border search regions may be limited to three regions, e.g., top, left, and right regions, to save search time when documents are scanned in this manner.

If a reliable line is found in the searched region (stage 204), the skew angle of the check may be calculated based on the reliable line (stage 206). A line may be designated as reliable if, for example, its length exceeds a predetermined or adaptive threshold. Reliability may be based on other factors such as straightness, thickness, proximity to a border, etc., each of which may be considered individually or in combination with one or more other factors. In addition, the check's skew angle may be calculated by first determining an orientation of the reliable line including, e.g., a slope a of the reliable line with respect to an image border or the imaging coordinate system. Based on the orientation or slope a the skew angle may be calculated using a trigonometric function, e.g., $\tan^{-1}(\alpha)$.

If a reliable line is not found in stage 204, the method may confirm that only one region has been searched (stage 208) and may then increment search region index "n" (stage 210) to begin searching for lines in a new region (stage 202). If a reliable line is found in the second region (stage 204), the line may be a basis for calculating the skew angle (stage 206). However, if neither search produces a reliable line, skew angles corresponding to sub-optimally reliable lines in each region may be compared to determine whether they are consistent (stage 212). To implement the comparison, lines found in each region may be ranked by a reliability factor such as line length. Although none of the lines may meet a reliability threshold applied by stage 204, one or more of the most reliable lines from each searched region may be used to calculate candidate skew angles corresponding to each region. The candidate skew angles may be compared and, if they are sufficiently correlated (stage 214), the candidate skew angle corresponding to the most reliable line of the searched regions may be selected (stage 216). Alternatively, to reduce calculations, the comparison performed in stage 212 may simply compare orientations of the most reliable lines from each searched region without calculating candidate skew angles. For example, if the orientation of compared lines is perpendicular (when comparing lines from a top or bottom region with lines from a lateral region) or parallel (when comparing lines from lateral regions) within a tolerable degree of error, the method may proceed to stage 216 to calculate the skew angle corresponding to the most reliable of the compared lines.

If the search of a third region produces no reliable lines (stage 204), candidate skew angles or line orientations from the third region and from each of the previously searched regions may be compared to each other (stage 212). If a high correlation exists between lines in at least two of the regions, the skew may accordingly be selected or calculated based on the most reliable line of the searched regions.

If the comparison among lines in all three regions is unsuccessful, the method may confirm no other regions remain to be searched (stage 218) and may output a default skew angle of zero degrees. If desired, a maximum number of regions to search ("max_n") may be set to four instead of three, thereby forcing a search of, for example, a bottom region of the check and potentially another comparison of candidate skew angles or line orientations from each of the four searched regions. However, as explained above, a bottom region may be omitted from the search process to save time, especially where lines are expected to be absent or difficult to detect in that region. In one embodiment, the order of search may start with a top region, where lines are expected to be longest, then to a left region and finally a right region. Alternatively, a right region may be searched before a left region.

Moreover, where a document is anticipated to have more than four borders, the "max_n" value may accordingly be set higher in correspondence to a higher number of border search regions. Therefore, the searching and comparing stages may, in such cases, be repeated more than four times.

2. Line Searching Methods

The search for lines in each region (stage 202) may be performed according to various methods or techniques. In one exemplary method, shown in FIG. 3, a document, or some region thereof, is searched for a border or for a line on the face of the document having a deterministic orientation (e.g., parallel or perpendicular) with respect to a border. The searching method may include various stages, which may optionally be iterated for increased search accuracy. The stages may include edge detection (stage 302), line detection (stage 304), and line approximation (stage 306), each of which is explained in greater detail below.

2.1 Edge Detection Methods

Various different edge detection techniques and filters may be used for detecting edges in an image including, for example, a Sobel edge detector, a Canny edge detector, and gradient edge detectors. For example, a one-dimensional gradient detection filter, e.g., (−1,−1,0,1,1), can be applied relatively quickly with few computations and, because the skew angles are frequently expected to be small, such a filter can adequately produce reliable horizontal or vertical edge gradient images. The one-dimensional gradient filter may applied in a vertical direction to detect lines having a horizontal (or partially skewed horizontal) orientation. Similarly, the one-dimensional gradient filter may be applied in a horizontal direction (or the image may be rotated ninety degrees and the filter may be applied in a vertical direction) to detect lines having a vertical (or partially skewed vertical) orientation. The filter may be applied to an entire image or just to a region being searched.

Thresholding may then be performed. To perform thresholding pixels in the edge gradient filtered image may be compared with a predetermined or adaptive threshold to produce a binary edge image. For example, any pixel with a gradient smaller than the threshold may be output as an edge pixel (e.g., low intensity) and all others may be output as background pixels (e.g., high intensity). It may be necessary to adjust the threshold value when, for example, the image is noisy, particularly in a region where borders are anticipated to be found. In addition, thresholding may be performed with a global threshold value, local threshold values, or by a process involving various types of thresholding.

2.2 Line Detection Methods

After detecting edges (stage 302) in accordance with the methods described above, lines in a search region may be detected (stage 304). Detection of lines may be performed in accordance with an edge linking algorithm, such as a local edge linking algorithm or a relaxation labeling algorithm, and may generally include two scan stages. First, a corner area of the search region may be scanned to find an edge pixel. For example, the search region may first be scanned top to bottom, starting at the leftmost side. Once an edge pixel is found, the second scanning stage may evaluate nearest neighbor pixels to find a line that extends in any direction from the edge pixel found in the first scanning stage. If a line is found to extend from an edge pixel both ends of the line may be searched for additional edge pixels. The two scanning stages may then be iterated to find additional lines. The line search may end when an entire region has been searched or when a sufficiently reliable line is detected. As discussed above, reliability of a line may be based on several factors including, for example, the degree of line straightness, line length, and presence of holes.

Figure 4:
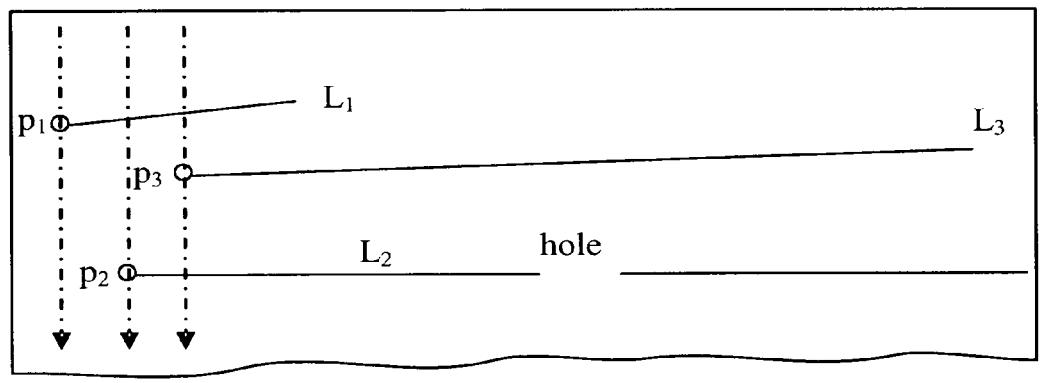
FIG. 4 illustrates an exemplary representation of a gradient filtered and thresholded check image consistent with the present invention.

FIG. 4 shows an exemplary representation of a gradient filtered and thresholded check image having three lines. In the figure, edge pixel p1 may be found in a first scanning stage. All or at least a portion of the edge pixels in the line labeled L1 may then be identified by a second scanning stage in which neighboring pixels are evaluated. Next, the first scanning stage may be iterated, with scan-lines (represented by dashed lines) moving progressively toward the right until edge pixel p2 is found. Then, by evaluating neighboring pixels, at least a portion of line L2 may be identified. Finally, at least a portion of line L3 may be identified in a similar manner. A resolution or distance between scan-lines may be predetermined or configurable and may be set to an efficient value in accordance with various criteria including, for example, reduction of search time without unduly sacrificing search thoroughness.

The edge linking algorithms described above may be modified to tolerate small holes along a detected line, which may result from, for example, image noise or wrinkles on the original check. Thus, evaluation of nearest neighbor pixels may include evaluation of pixels within a threshold distance of a detected edge pixel, not just immediately neighboring pixels. However, edge linking may stop when a hole that is detected is too large, e.g., exceeds a first threshold hole length, for the line to be considered reliable. Thus, if a length of the hole to the right of line L2 exceeds the first threshold hole length, the edge linking algorithm may define line L2 as ending at the hole. In addition, if too many holes (e.g., greater than a threshold number) are detected the line may be considered unreliable. A second threshold length smaller than the first threshold hole length may be applied to determine whether a gap in a line is sufficiently large to be classified as a hole instead of being attributed to noise or the like.

In certain embodiments, edge detection may be iterated in a search region after line detection has completed. The iteration may use a different binary threshold value to improve detection of lines having weak edges. Because such iterations are time-consuming due to increased computations their implementation may be limited to cases where no sufficiently reliable line is detected or where no edge pixels are detected in a search region.

2.3 Line Approximation Methods

After a line has been detected (stage 304) a line approximation process (stage 306) may commence to determine how straight the detected line is. The line approximation process may begin after an entire region has been searched or, alternatively, as soon as a line is detected. In certain embodiments, line approximation may be performed only on lines that exceed a reliability threshold or, where multiple lines are found in a region, on the most reliable (e.g., longest) line, regardless of whether any of the lines exceed the reliability threshold.

To evaluate the straightness of a detected line all points or pixels on the line may be fit to a line approximation equation, e.g., $y=\alpha x+b$, by solving a least-square system. Straightness of the detected line may be evaluated and compared to one or more straightness thresholds by, for example, calculating an average residual error of the line approximation for all pixels on the line. The detected line may be considered sufficiently straight if the average residual error is less than a predetermined error threshold or if a predetermined number of pixels are not outliers with respect to the best fit line approximation (e.g., their residual error is not above a predetermined threshold). The total number of non-outlier pixels may be used to measure the line length, which may in turn be used as one factor or as the sole factor to evaluate the line's reliability for determining image skew angle. For example, if a straight portion of the detected line is not long enough it may be discarded as unreliable.

To detect certain low contrast parts of a line, line detection and/or edge detection may be iterated with line approximation. For example, once a good line approximation is obtained, a search for weak edges along the line may be conducted from both ends of the line. In addition, if a detected line that is otherwise reliable due to, for example, its length and lack of holes, is discovered to be insufficiently straight during the line approximation process, the line detection process may be iterated to search for new lines. However, because such iterations are time-consuming due to increased computations their implementation may be limited to cases where no sufficiently reliable line is detected in a search region or where a large number of unevaluated pixels exist in the search region. A large number of unevaluated pixels may exist in a search region if, for example, detection of the otherwise reliable line terminated the search early, i.e., after evaluation of only a small portion of the search region. Moreover, a threshold used to determine whether a large number of unevaluated pixels exist may be configurable and may vary according to search region size.

3. Examples of Scanned Checks

Figure 5:
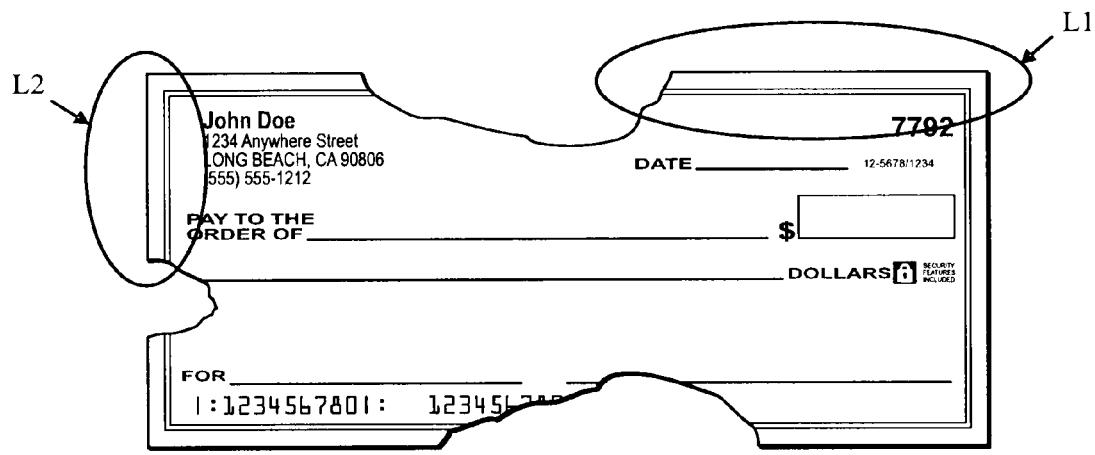
FIGS. 5-7 each illustrate an exemplary skewed check image that may be processed by the exemplary methods of FIGS. 2 and 3.
Figure 6:
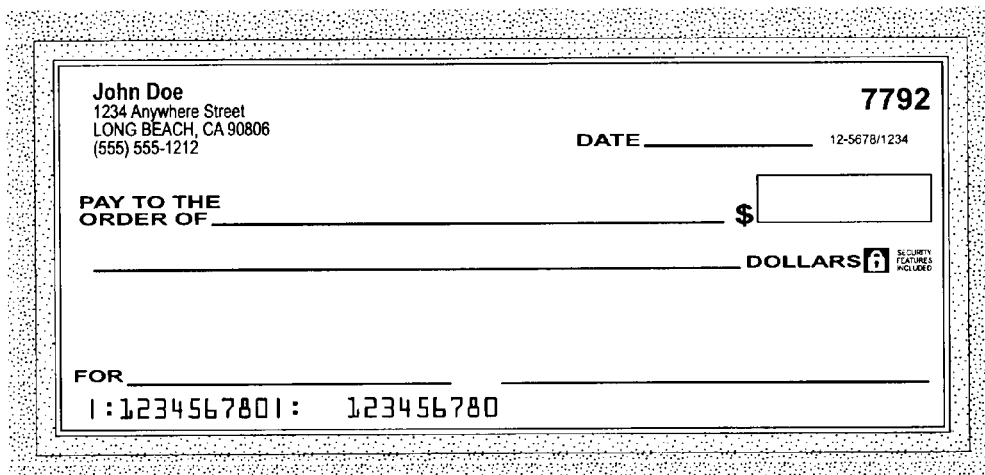
Figure 7:
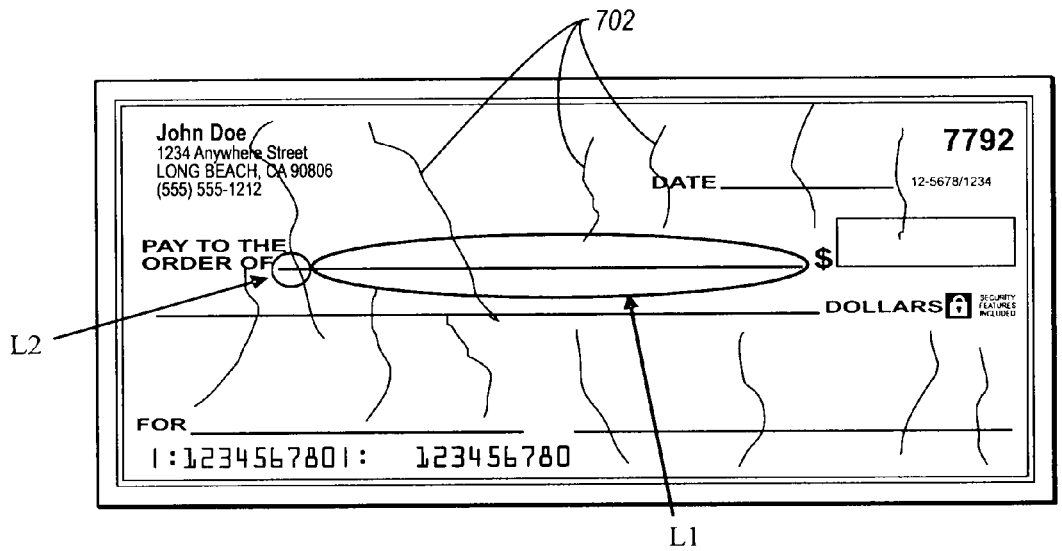

For illustration purposes, FIGS. 5-7 demonstrate how the skew detection methods described above may operate on certain exemplary check images.

In FIG. 5, the top and bottom borders as well as the left border are broken by tears in the check. Line L1 is the longest line in the top region and line L2 is the longest line in the left region. Thus, depending on how high a length threshold is configured for ensuring line reliability, neither of lines L1 and L2 may be considered reliable after searching those two regions. However, before searching another region the skew detection method may compare candidate skew angles or line orientations of each of lines L1 and L2 and may discover a high correlation. In this manner a skew angle may be determined after searching only two regions.

Another exemplary check image is featured in FIG. 6. In this image, edges of the check may be difficult to detect due to the low contrast difference between the relatively dark-toned outer border of the check and the surrounding non-document region. However, the search method described above with reference to FIGS. 3 and 4 may have success detecting other lines such as the relatively light-toned rectangular frame or border printed on the face of the check or other lines printed on the face of the check. Thus, the topmost light-toned border may be detected in a top region search and a skew angle may be calculated thereby without having to search other regions.

Finally, in FIG. 7, a non-document region has been cropped out. Therefore, lines printed on the face of the check must be used to determine the check's skew angle. Unlike the check in FIG. 6, the outer frame or border printed on the face of this check may not be easily detectable. For example, the border or frame lines may be very thin and shaded with the same tones as the rest of the check's face. Therefore, the edge and line detection techniques may first detect a portion of the line on which the "Pay to the Order Of" party is filled out. However, due to wrinkles 702 or other features of the scanned image, a threshold applied during an edge detection stage may portions of the line to be blotted out, resulting in portion L1 of the line being detected but not portion L2. During an iteration of the edge detection stage a threshold value may be adjusted to detect weak contrast edges. As a result, portion L2 may subsequently be detected and appended to portion L1. Thus, the line approximation process will determine the straightness of the entire line, including line portions L1 and L2. The skew angle of the image may then be determined based on the entire line.

Example embodiments of methods for detecting skew in a scanned check have been described. Although embodiments have been described for use in detecting skew in checks, the principles and methods described herein may be applied to other documents. Moreover, stages shown in the methods of FIGS. 2 and 3 may be modified in various ways. For example, the order of stages may be varied, certain stages may be omitted and/or additional stages may be added. For example, the iteration of stages shown in FIG. 3 may be omitted or limited to extreme cases to decrease computational time. Moreover, where appropriate the stages may be implemented or may occur at frequencies differing from those described. In addition, the various thresholds described in the example embodiments may be predetermined thresholds, adaptable thresholds, or some of both types. If a threshold is predetermined it may also be configurable by a properly authorized user. Furthermore, a choice of whether a particular threshold is predetermined or adaptable may be configurable. The configuration of each threshold and whether to make it adaptable may depend on various potentially competing factors such as processing speed, accuracy, and document type.

Moreover, in one embodiment of the method in FIG. 2, a stage may be added after a skew angle is calculated in either of stages 206 or 216 of FIG. 2. In the added stage a check may be performed to determine if the calculated skew angle is unusually large, i.e., exceeds a predetermined threshold. If the skew angle is too large the method may start over or resume searching another region to detect additional lines and thereby confirm the unusually large result.

4 Computer Hardware and/or Software Implementations

Exemplary embodiments may comprise a general-purpose or special-purpose computer or device including various computer hardware implementations. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions consistent with the methods described herein. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, check scanners (example of which include, but are not limited to, the Epson CaptureOne™ Check Scanner and the Epson TM-S1000 manufactured by Seiko Epson Corporation), copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/check scanner combination (examples of which include, but are not limited to, the Epson TM-J9000, TM-J9100, TM-J7000, TM-J7100, and TM-H6000111, all manufactured by Seiko Epson Corporation) or a digital camera/camcorder combination. An image processing device may include a de-skewing capability, for example, to automatically produce a de-skewed image by detecting and correcting an image's skew. The skew may be detected based on the orientation of lines appearing in the image, e.g., lines on a document, such as a check, in the image. For example, a check scanner with this automatic de-skewing capability may include one or more computer-readable media that implement the example methods of FIGS. 2 and 3, or a computer connected to the check scanner may include one or more computer-readable media that implement the example methods.

Figure 8:
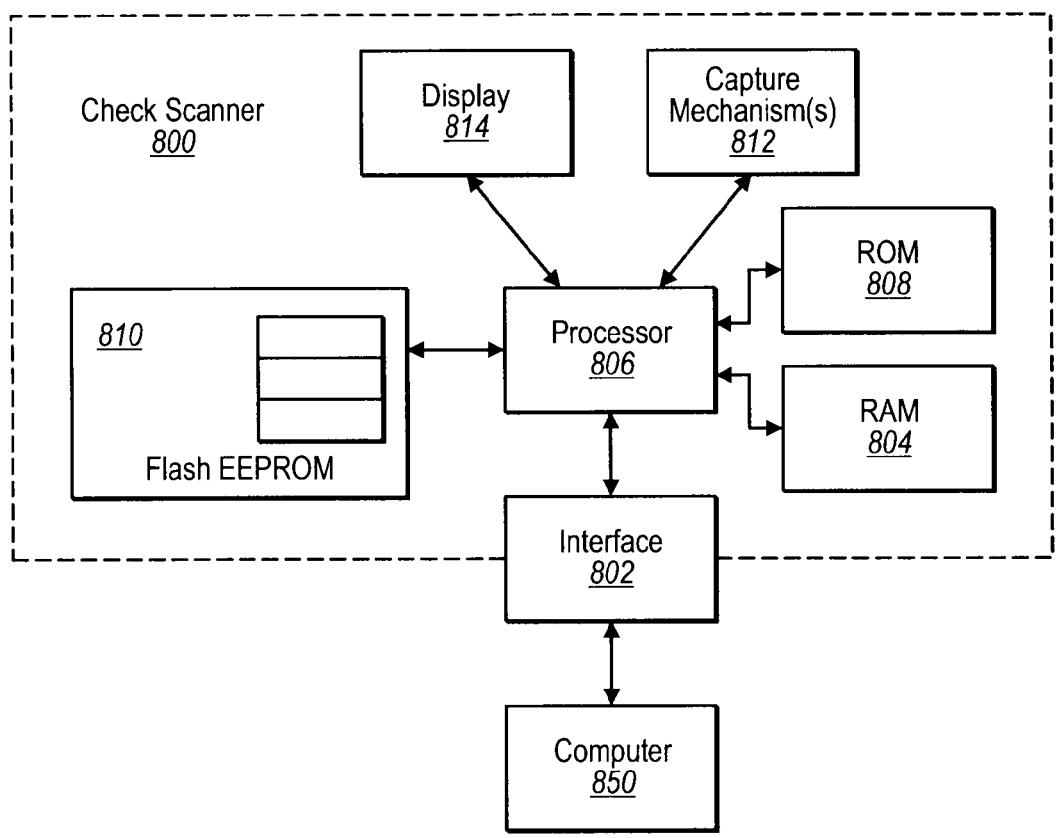
FIG. 8 is a schematic representation of an image processing device in the form of an example check scanner.

A schematic representation of an example check scanner 800 is disclosed in FIG. 8. The example check scanner 800 exchanges data with a host computer 850 by way of an intervening interface 802. Application programs and a check scanner driver may also be stored for access on the host computer 850. When an image retrieve command is received from the application program, for example, the scanner driver controls conversion of the command data to a format suitable for the check scanner 800 and sends the converted command data to the check scanner 800. The driver also receives and interprets various signals and data from the check scanner 800, and provides necessary information to the user by way of the host computer 850.

When data is sent by the host computer 850, the interface 802 receives the data and stores it in a receive buffer forming part of a RAM 804. The RAM 804 can be divided into a number of sections, for example through addressing, and allocated as different buffers, such as a receive buffer or a send buffer. Data, such as digital image data, can also be obtained by the check scanner 800 from the capture mechanism(s) 812. For example, the capture mechanism(s) 812 can generate a digital photographic image of a paper check. This digital image can then be stored in the receive buffer or the send buffer of the RAM 804.

Figure 3:
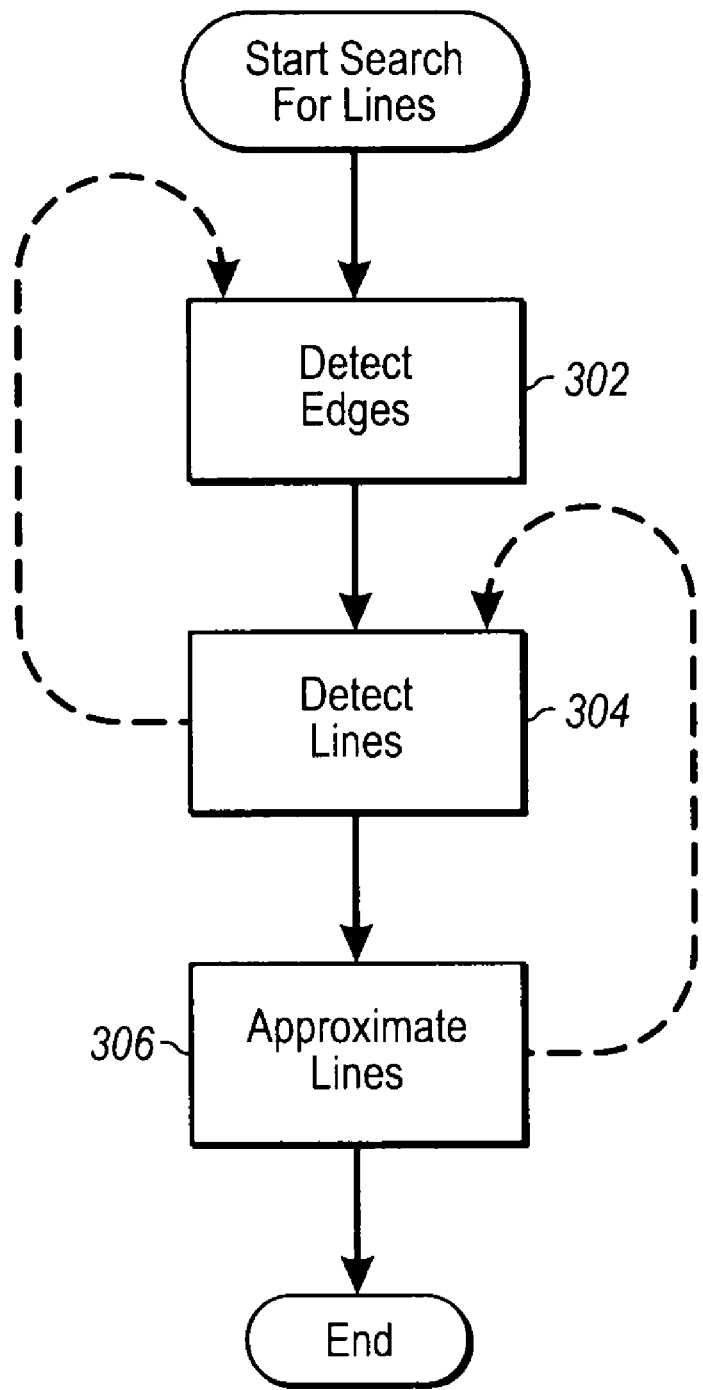
FIG. 3 illustrates an exemplary embodiment of a method for implementing a line searching stage in the method of FIG. 2.

A processor 806 uses computer-executable instructions stored on a ROM 808 or on a flash EEPROM 810, for example, to perform a certain function or group of functions, such as the methods of FIGS. 2 and 3, for example. Where the data in the receive buffer of the RAM 204 is a digital image, for example, the processor 806 can implement the methodological acts on the digital image of the exemplary methods to automatically detect skew in the digital image to produce a de-skewed digital image. Further processing in an imaging pipeline may then be performed on the de-skewed digital image before the de-skewed digital image is displayed by the check scanner 800 on a display 814, such as an LCD display for example, or transferred to the host computer 850, for example.

It is understood that digital images may be received by the check scanner 800 from sources other than the computer 850 and the capture mechanism(s) 812, including, but not limited to, the flash EEPROM 810 or the ROM 808. Example embodiments of the check scanner 800 include, but are not limited to, the Epson CaptureOne™ Check Scanner or the Epson TM-S1000, TM-J9000, TM-J9100, TM-J7000, TM-J7100, or TM-H6000111, all manufactured by Seiko Epson Corporation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for detecting skew in an image to produce a de-skewed image, the method comprising:
    scanning a first region of the image for a first group of one or more lines;
    scanning a second region of the image for a second group of one or more lines if none of the lines in the first group of one or more lines is reliable; and
    if none of the lines in the second group of one or more lines is reliable, using a processor to:
    compare an angle of a line in the first group of one or more lines with an angle of a line in the second group of one or more lines; and
    determine the skew angle of the image based on the comparison of the first and second line angles if a difference between skew angles corresponding to each of the compared first and second line angles is lower than an error threshold.

2. The method as recited in claim 1, further comprising:
    scanning a third region of the image for a third group of one or more lines if the difference between skew angles corresponding to each of the compared first and second line angles is higher than the error threshold; and
    if none of the lines in the third group of one or more lines is reliable, using a processor to:
    compare an angle of a line in the third group of one or more lines with the first and second line angles; and
    determine the skew angle of the image based on the comparison of the first, second, and third line angles if a difference between skew angles corresponding to at least two of the compared first, second, and third line angles is lower than the error threshold.

3. The method as recited in claim 2, further comprising using a processor to:
    determine the skew angle of the image based on a line in the first group of one or more lines if the line in the first group of one or more lines is reliable;
    determine the skew angle of the image based on a line in the second group of one or more lines if the line in the second group of one or more lines is reliable;
    determine the skew angle of the image based on a line in the third group of one or more lines if the line in the third group of one or more lines is reliable; and determine that the skew angle is zero if the difference between skew angles corresponding to at least two of the compared first, second, and third line angles is higher than the error threshold.

4. The method as recited in claim 2, wherein the first region corresponds to an upper or lower portion of the image and the second and third regions each correspond to a lateral portion of the image.

5. The method as recited in claim 2, wherein reliability of a line found in at least one of the first, second, and third regions is dependent on at least one of:
- a straightness of the found line;
- a length of the found line; and
- a length of a hole, if one exists, in the found line.

6. One or more computer-readable media having computer-executable instructions thereon which, when executed, implement a method for skew detection in an image, the method comprising:
- scanning a first region of the image for a first group of one or more lines;
- scanning a second region of the image for a second group of one or more lines if none of the lines in the first group of one or more lines is reliable; and
- if none of the lines in the second group of one or more lines is reliable:
- comparing an angle of a line in the first group of one or more lines with an angle of a line in the second group of one or more lines; and
- determining the skew angle of the image based on the comparison of the first and second line angles if a difference between skew angles corresponding to each of the compared first and second line angles is lower than an error threshold.

7. An image processing device comprising:
- a processor; and
- the one or more computer-readable media as recited in claim 6, the computer-readable instructions thereon being configured to be executed by the processor.

8. The image processing device as recited in claim 7, wherein the image processing device comprises a printer, a scanner, a check scanner, a digital camera, a digital camcorder, or a portable photo viewer, or some combination thereof.

* * * * *